April 25, 1950  F. M. TOMLINSON  2,505,221
HYDRAULIC CONTROL FOR MACHINE TOOLS
Filed Dec. 19, 1945  4 Sheets-Sheet 1

INVENTOR.
FAY M. TOMLINSON
BY
Kwis Hudson Boughton & Williams
ATTORNEYS

Fig. 2

Patented Apr. 25, 1950

2,505,221

UNITED STATES PATENT OFFICE 2,505,221

HYDRAULIC CONTROL FOR MACHINE TOOLS

Fay M. Tomlinson, Lakewood, Ohio, assignor to The Warner & Swasey Company, Cleveland, Ohio, a corporation of Ohio Application December 19, 1945, Serial No. 636,039

12 Claims. (Cl. 192—4)

This invention relates to a machine tool and particularly to an improved mechanism for controlling the speeds, direction of operation and the starting and stopping of a movable part of a machine tool such as the work spindle.

An object of the invention is to increase the efficiency of a machine tool as, for instance, a lathe, by enabling the operator to effect with a minimum of effort and skill on his part the changes in speed, direction of operation and the starting and stopping of a movable part of the machine tool, as for instance the work spindle.

A more specific object is to increase the efficiency of a machine tool, such as a lathe, by enabling the operator to effect with a minimum of attention and skill on his part the starting and stopping of the work spindle in the headstock, the direction of rotation of said spindle and the shifting of the gears of the change speed transmission in the headstock to vary the speed of rotation of the spindle.

Another object of the invention is to accomplish the objects above enumerated in such a way as to reduce the wear and tear on the change speed transmission and thus increase the life of the machine and keep maintenance costs to a minimum.

Another object of the invention is to provide in a machine tool of the type having a movable part, a change speed transmission for moving said part at different speeds in opposite directions and means for selecting or preselecting the speed of said part for the different operative steps of a work cycle; improved and novel means for attaining the selected or preselected speed of said part and which means automatically effects a complete speed changing cycle of operation after the operator has, manually initiated said cycle of operation.

Another object is to provide in a machine tool such as referred to in the last named object a safety feature whereby the means for selecting or preselecting the different speeds of the movable part cannot be operated by the operator during the automatic cycle of operation of the speed changing mechanism.

Another object of the invention is to attain the above mentioned objects by means of an improved and novel pressure fluid operated mechanism for effecting the automatic cycle of the speed changing operation.

Another and more detailed object of the invention is to provide a pressure fluid operated mechanism as referred to in the last object and wherein the automatic cycle of operation includes the disengagement of the clutch, the initiation of a slow speed non-working drive to the transmission to facilitate the shifting of the shiftable elements, a shifting of said elements in a predetermined way and the reengagement of the main drive clutch.

Another object is to provide a safety feature to prevent injury to the shiftable gears of the transmission by including in the fluid operated mechanism provision for automatically arresting shifting movement of the gear shifting members whenever the gears to be intermeshed cannot properly engage, then automatically driving the transmission at a slow non-working speed to cause the teeth of said gears to assume a relationship wherein the gears may be properly intermeshed and then reestablishing the gear shifting movement of said members.

Another object is to provide an improved braking means for stopping the movement of the movable part quickly and for then holding said part in stopped position and wherein the brake is applied for a predetermined period of time with a maximum pressure to overcome quickly the momentum of the movable part after which the brake is held applied with a reduced relatively low predetermined pressure to hold the part in stopped position although permitting slow manual movement thereof for loading and unloading purposes.

Another object is to provide a fluid pressure operated mechanism as referred to in the last object and wherein a single manually moved control member, in addition to initiating the automatic cycle of the speed changing operation may selectively control without initiating said cycle the direction of operation of the change speed transmission and the engagement and disengagement of the main clutch and the application of a brake means.

Further and additional objects and advantages of the invention not hereinbefore referred to will become apparent hereinafter during the detailed description of an embodiment of the invention illustrated in the accompanying drawings wherein.

Figure 1:
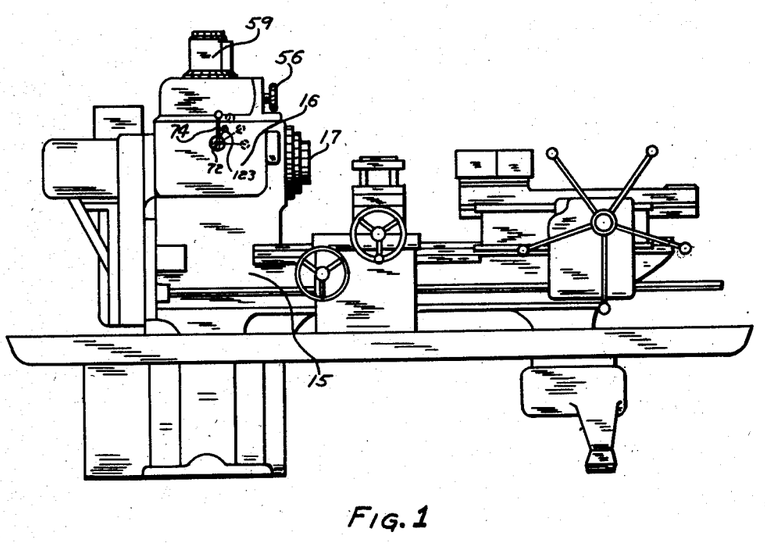
Fig. 1 is a front elevational view of a turret lathe to which the invention has been applied for purposes of illustration.

In Fig. 1 is shown a turret lathe comprising a bed 15 at one end of which is located the headstock 16. A work spindle 17 is rotatably mounted in the headstock to be driven at a plurality of different speeds and in opposite directions by means of change speed gearing which will now be described.

Figure 2:
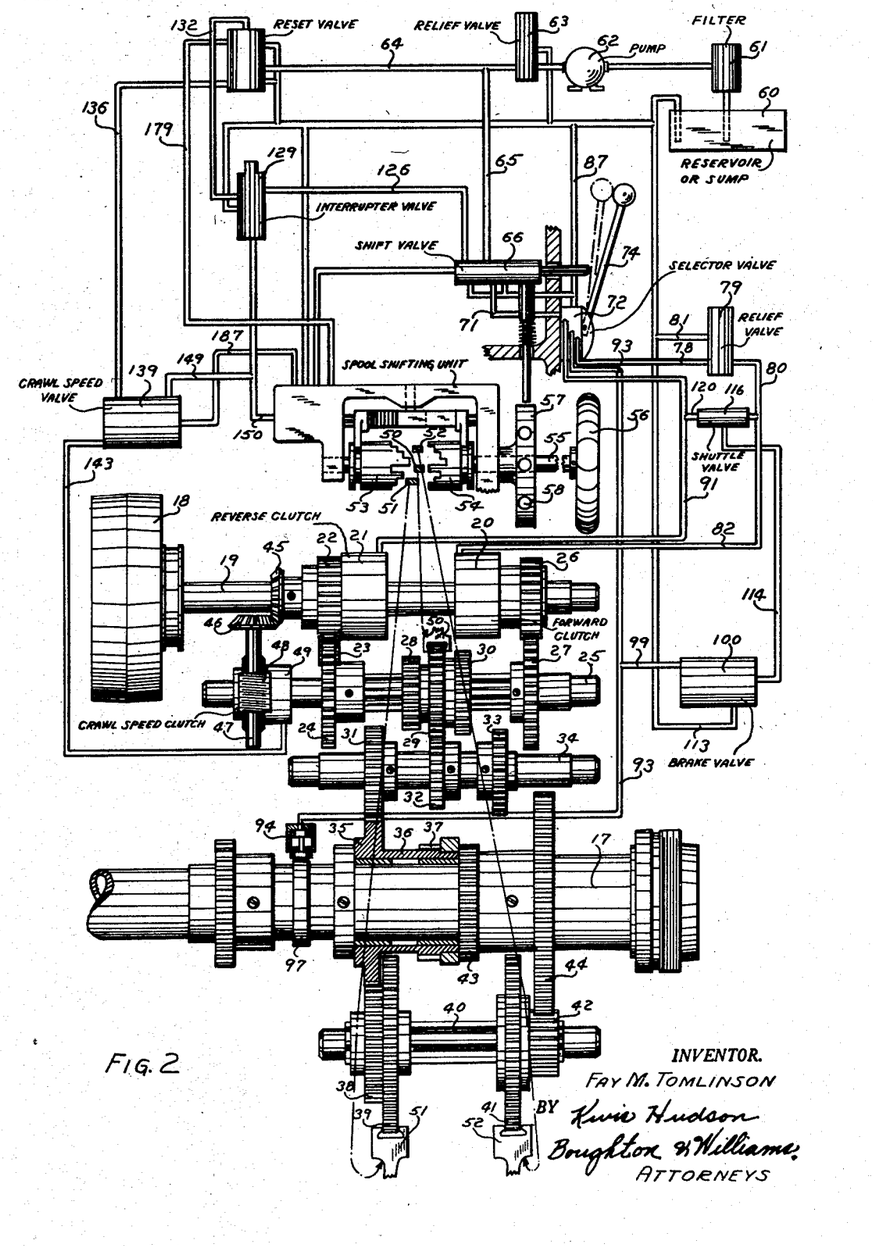
Fig. 2 is a developed and diagrammatic view illustrating the embodiment of the invention in connection with the change speed gearing that drives the work spindle in the headstock of a lathe.

Referring to Fig. 2 wherein the change speed gearing is illustrated, it will be seen that a power source, in this instance a pulley 18, is secured to the main drive shaft 19 and that said pulley can be driven in any suitable manner. A pressure fluid operated forward clutch 20 and a pressure fluid operated reverse clutch 21 are mounted on the main drive shaft 19 and when actuated cause the gear 26 or the gear 22, respectively, to rotate with the shaft 19 on which said gears are normally freely rotatable. The gear 22 meshes with an idler gear 23 which in turn meshes with a gear 24 fixed to a shaft 25, whereby said shaft 25 may be driven by the shaft 19 but in the opposite or reverse direction. The gear 26 meshes with a gear 27 fixed to said shaft 25 whereby said shaft may be driven by the shaft 19 in the same or forward direction.

A three-step gear cone composed of gears 28, 29 and 30 is splined to shaft 25 intermediate the gears 24 and 27 for rotation with said shaft and for shifting movement axially thereof, and said gears 28, 29 and 30 mesh, respectively, with gears 31, 32 and 33 fixed to a shaft 34. It will be noted that shaft 34 can be driven at any one of three speeds in either the forward or reverse direction.

The gear 31 constantly meshes with a gear 35 formed on the sleeve 36 that is freely rotatable on the spindle 17 but is held against axial movement thereon. The sleeve 36 is also provided with a gear 37 located adjacent the opposite end of the sleeve from the gear 35. The gears 35 and 37 mesh, respectively, with gears 38 and 39 of a shiftable rear two-step gear cone that is splined to the shaft 40. It will be seen that the shaft 40 can be driven at any one of six speeds in either the forward or reverse direction.

The shaft 40 also has splined thereto a shiftable front two-step gear cone formed of gears 41 and 42 with the gear 41 adapted to be intermeshed with gear 43 fixed to the spindle 17, while the gear 42 can be intermeshed with the gear 44 also fixed to said spindle, wherefore it will be seen that in the present illustration the spindle 17 can be driven from the main drive shaft at any one of twelve speeds in either the forward or reverse direction.

The shaft 25 can be driven also from the main drive shaft 19 at a slow non-working speed, hereinafter referred to as a "crawl speed" by mechanism which will now be described, and for the purpose of facilitating the shifting of the gears.

A bevel gear 45 is fixed to the drive shaft 19 and meshes with another bevel gear 46 fixed to a short shaft 47 that is rotatably supported in the headstock and extends transversely of the shaft 25. The shaft 47 has fixed thereto intermediate its ends a worm 48 which meshes with a worm wheel that forms part of the normally disengaged pressure fluid operated "crawl speed" clutch 49 mounted on the shaft 25 and the action of which will be described hereinafter.

The shiftable three-step gear cone on the shaft 25 and the rear and front two-step gear cones on the shaft 40 are shifted, respectively, by gear forks 50, 51 and 52 movably mounted in the headstock and operatively interconnected with said gear cones as indicated by the dash and dot lines in Fig. 2 and as will be well understood in the art.

The spindle speed for each operative step of a work cycle may be selected at the end of the preceding operative step or it may be preselected during the preceding step by selecting or preselecting means in the form of spools 53 and 54 splined on an indexible shaft 55 to be indexed with said shaft and to be moved endwise thereon from a separated indexing position toward each other to actuate the gear forks 50, 51 and 52 located intermediate the spools in a position to be engaged by the cooperating series of projections on the adjacent faces of the spools, as clearly explained in detail in the patent to Max E. Lange 2,068,552, issued January 19, 1937. The shaft 55 extends outwardly of the headstock and can be indexed by means of a hand wheel or knob 56 fixed thereto. The shaft 55 inwardly of the headstock also has fixed thereto an interlock drum 57 (see Figs. 2, 3 and 4) provided in its periphery with a plurality of circumferentially spaced openings or recesses 58, the purpose of which will later be pointed out.

The hand wheel or knob 56 and the headstock may be provided with suitable indicia and pointer means, not shown, to indicate to the operator in relation to spindle speeds the various indexed positions of the spools or the shaft 55 may be operatively interconnected with an indicating device 59 located on the headstock and functioning to indicate to the operator the various indexed positions of the spool in relation to spindle speeds and also in relation to the different operative steps of the work cycle. Although various forms of indicating devices might be employed for this purpose the one shown herein is similar to the indicating device disclosed in the patent to Max E. Lange No. 2,169,765, issued August 15, 1939.

Figure 3:
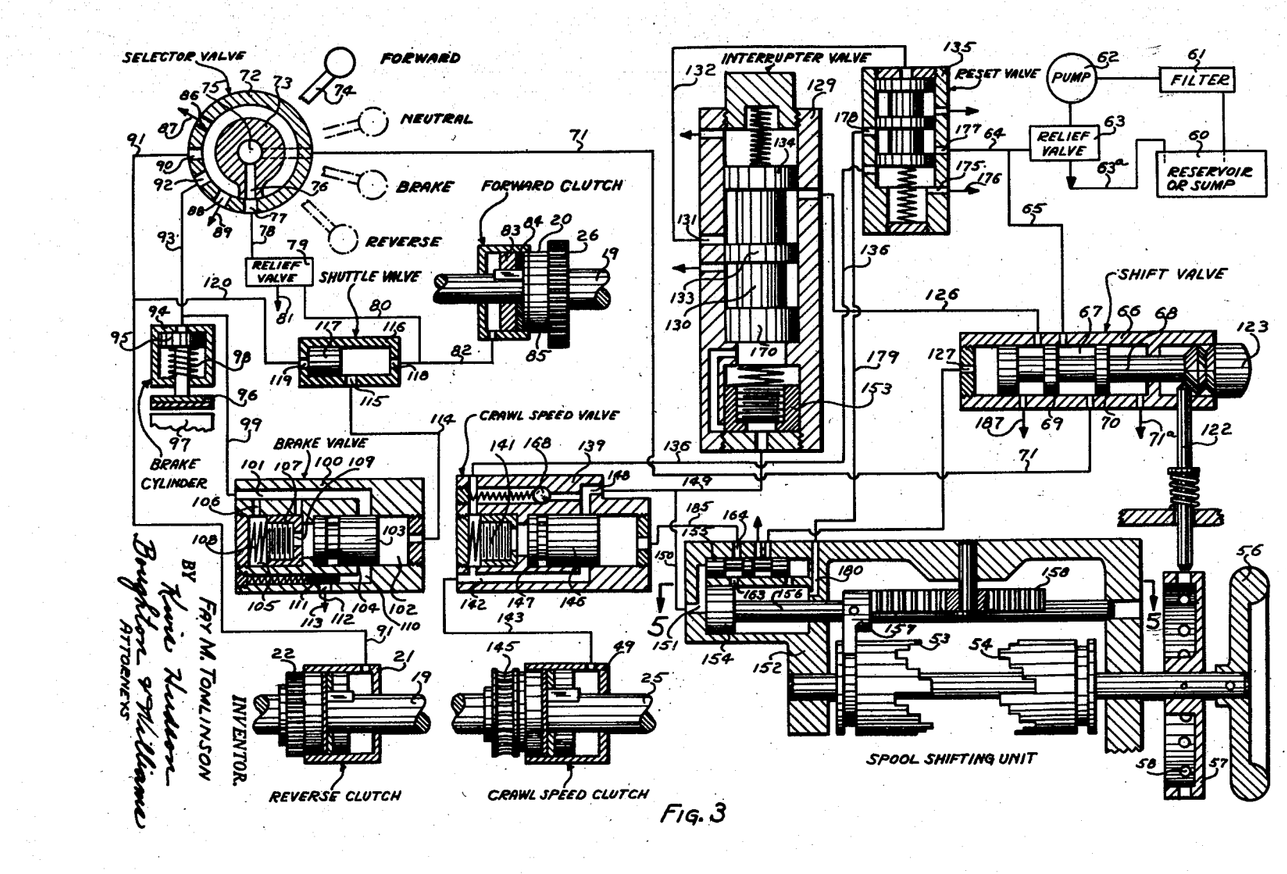
Fig. 3 is a diagrammatic view of the control mechanism and the pressure fluid circuit for operating the same, with the parts of the mechanism shown in positions they occupy when the work spindle is operating in the forward direction.
Figure 4:
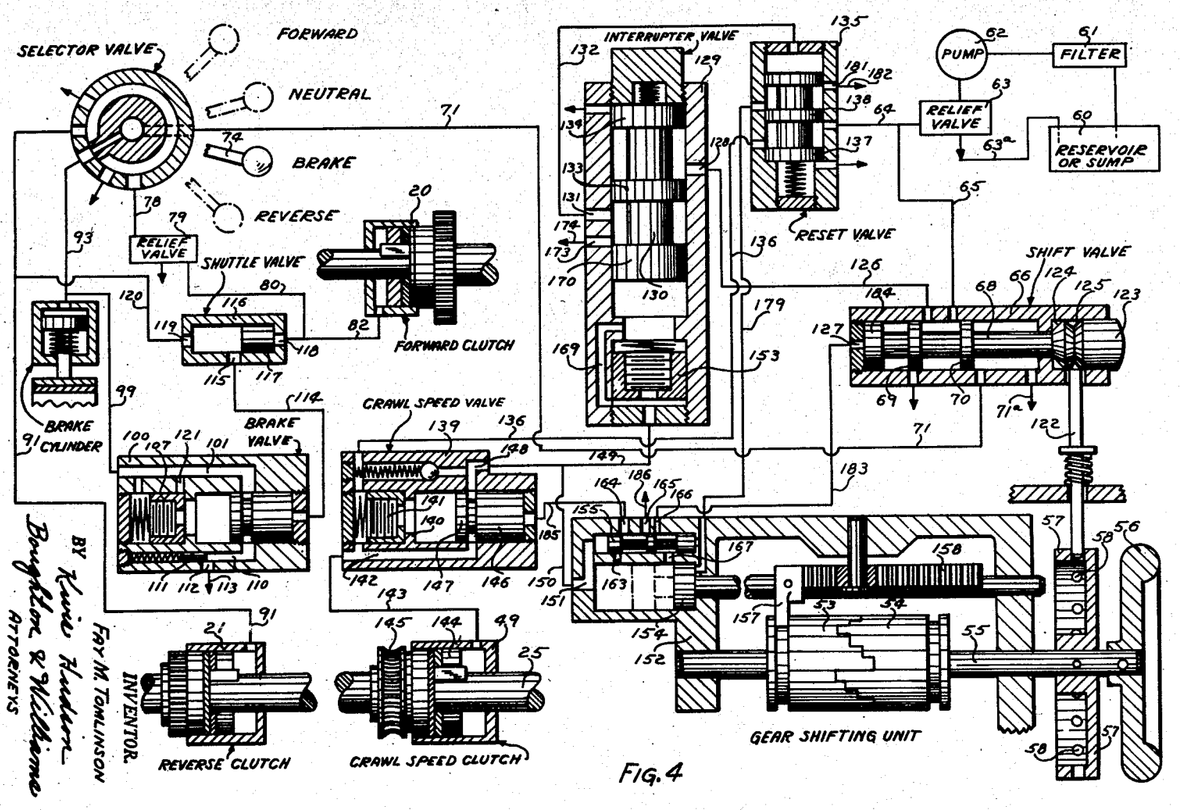
Fig. 4 is a view similar to Fig. 3 with the parts of the control mechanism in a different relationship.

Referring now to the diagrammatic view of the control mechanism and the pressure fluid circuit for operating the same shown in Figs. 2, 3 and 4, it will be noted that pressure fluid, in this instance, a liquid, is pumped into the circuit from a reservoir or sump 60 through a filter 61 by a constantly operating pump 62. A relief valve 63 well known in the art is connected to the pump and to the hydraulic circuit lines 64 and 65 and to the reservoir 60 by the line 63a, wherefore fluid is forced into said conduit lines at a predetermined pressure. Wherever in the diagram a conduit line bears an arrow it will be understood that such line leads to the sump similarly as does line 63a. The line 65 is connected to a valve 66, hereinafter designated as the shift valve. The pressure fluid when said shift valve 66 is in its normal inactive position, as illustrated in Fig. 3, enters the annular space 67 surrounding the valve plunger 68 and intermediate the lands 69 and 70. The pressure fluid at this time leaves the annular space 67 of the shift valve 66 and passes into the line 71 which is connected to the inlet of the selector valve 72.

The selector valve 72 contains a rotatable core or plug 73 which is moved to its various positions in the valve casing by means of a manually operated lever 74 that is operatively connected to the core or plug and is located on the front side of the head stock where it is readily accessible to the operator (see Fig. 1). Said lever 74 in addition to having a rocking movement substantially in the plane of the front side of the headstock to rock the valve core or plug 73 also has an inward rocking movement in a direction transverse to its first mentioned rocking movement for the purpose of moving the shift valve plunger 68 as later to be explained. The valve core or plug 73 is provided with an axially extending bore 75 to which the line 71 is connected. The core or plug 73 is of less diameter than the internal diameter of the valve housing and is provided with a radially projecting land which has sliding contact with the interior of the valve housing. The core 73 is provided with a radially extending passage 76 communicating with the bore 75 and adapted to be brought selectively into registration with one port or another of a plurality of ports formed in the valve housing and normally communicating with the space between the interior of said housing and the valve plug.

When the lever 74 of the selector valve 72 is in the full line position of Fig. 3, i. e., the "forward" position, the passage 76 is in registry with the port 77 and to which port the line 78 is connected. Consequently the pressure fluid flowing through line 71 passes through the selector valve core or plug and into the line 78 at this time. The line 78 is connected to a relief valve 79 and said relief valve 79 is also connected with a line 80 and with a sump return line 81 illustrated in part and similar to the line 63a. The line 80 is interconnected with the line 82 that communicates with the cylinder of the pressure fluid operated forward clutch 20. The forward clutch 20 is composed of a cylinder fixedly supported in the headstock and in which is slidably mounted a piston 83 that is splined on the shaft 19 and said piston carries on its right hand face, as viewed in Fig. 3, a friction plate 84 which engages a friction plate 85 carried by the hub of the gear 26 that is freely rotatable on the shaft 19. It will be seen that when the lever 74 is in the full line position of Fig. 3 and pressure fluid is in line 71, said fluid flows through the selector valve 72, through the relief valve 79, lines 80 and 82 and into the cylinder of the forward clutch 20 to move the piston 83 thereof toward the right to engage the friction plates 84 and 85 and thus to cause the gear 26 to be rotated by the shaft 19.

When the control lever 74 is moved from the full line position of Fig. 3 into any of the dot and dash line positions indicated therein, then the port 77 is in communication with the space between the valve block or core 73 and the valve housing of the selector valve 72, and consequently pressure fluid in the cylinder of the forward clutch 20 and in the lines 82, 80 and 78 can return to the sump through the port 86 of the valve housing and the line 87 which is extended to the sump, and at such time the forward clutch will be disengaged and the shaft 19 will rotate freely relative to the gear 26.

Assuming that the lever 74 is moved to the dash and dot line position identified in Fig. 3 as "neutral" then the passage 76 in the valve core or plug 73 registers with the port 88 of the valve housing and said port is connected to line 89 which is extended to the sump. Consequently the pressure fluid in the line 71 passes through the selector valve 72 and returns to the sump at this time and none of the devices of the control mechanism are active and both the forward and reverse clutches are disengaged.

Assuming that control lever 74 is moved from the "neutral" position indicated in Fig. 3 to the "reverse" position shown therein, the passage 76 in the core or plug registers with the port 90 in the housing of the selector valve 72, and said port 90 is connected with the line 91 that extends to the cylinder of the reverse clutch 21. The reverse clutch 21 is identical in structure with the forward clutch 20 and includes a piston slidable in the cylinder and splined to the shaft 19 and having a friction plate engageable with a friction plate on the hub of the gear 22 that is freely rotatable on the shaft 19. Consequently when the lever 74 of the selector valve 72 is in the "reverse" position just described pressure fluid is passing from the line 71 through said selector valve and through the line 91 to the cylinder of the reverse clutch 21 and the piston of said clutch has moved to frictionally engage the plates and cause the gear 22 to rotate with the shaft 19.

It will be understood that when the control lever 74 of the valve 72 is moved from "reverse" position into any of the other positions indicated, then the pressure fluid in the reverse clutch and in the line 91 returns to the reservoir or sump by way of the selector valve housing and the port 86 as described relative to the forward clutch 20.

When the lever 74 is moved to "brake" position, indicated by dot and dash lines in Fig. 3 and by full lines in Fig. 4, the passage 76 of the valve core or plug registers with the port 92 in the selector valve housing intermediate the ports 88 and 90. The port 92 communicates with the line 93 that extends to and communicates with the brake cylinder 94. A piston 95 is slidable in the brake cylinder 94 and the piston rod extends outwardly of said cylinder and has secured to its outer end a brake shoe or band 96 adapted to engage with the periphery of an annular flange 97 on the work spindle 17.

It will be seen that when the control lever 74 is moved to "brake" position (see Fig. 4) then the line 71 is connected through the selector valve with the line 93 and pressure fluid at line pressure enters the brake cylinder 94 to move the piston 95 thereof against the action of the spring 98 to engage the brake shoe 96 with the flange 97 with maximum pressure and hence apply a maximum braking action to quickly overcome the momentum and stop the rotation of the spindle 17.

When the lever 74 of the selector valve is moved to "brake" position and pressure fluid at full line pressure is flowing into the line 93 and into the brake cylinder 95, said pressure fluid also flows from the line 93 into the line 99 which extends to the brake valve 100. The brake valve 100 is provided with a passage 101 that extends to and communicates with the valve chamber 102 in which is slidably mounted a valve plunger which has a wide land 103 and a narrow land 104, with said wide land normally sealing communication between the passage 101 and the chamber 102 as indicated in Fig. 3. The brake valve 100 is also provided with a chamber 105 which is in communication with the passage 101 by a port 106. The chambers 102 and 105 are separated by an internal annular flange which acts as a stop for movement of the valve plunger in one direction and as a stop for a time delay unit now to be described.

Although various forms of time delay units might be used in the brake valve 100, for purposes of illustration the unit is shown as comprising a cup-shaped member 107 (see Figs. 3 and 6) slidably mounted in the chamber 105 with its open end adjacent to the port 106 and said cup-shaped member is pressed by a spring 108 toward the above mentioned internal flange. The closed end of the cup-shaped member is provided with a central port 109 and said member internally thereof carries a plurality of disks which function when pressure fluid is in the chamber 105 to cause said fluid to follow a tortuous path around or through the disks as illustrated by lines and arrows in Figs. 6 and 7 and therefore to create resistance to the flow of the fluid and slow down the rate of the flow through the cup 107 to the port 109.

Figure 6:
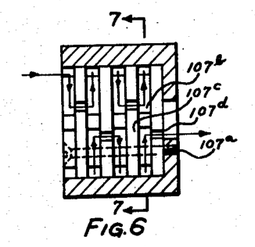
Fig. 6 is a detached enlarged longitudinal sectional view of the time delay units used in the brake valve, crawl speed valve and interrupter valve.
Figure 7:
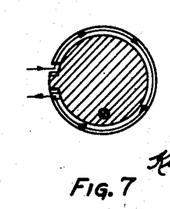
Fig. 7 is a sectional view taken on line 7—7 of Fig. 6.

The disks are of two types alternately arranged within the cup-shaped member 107 and held in position therein by a screw 107a. The disks 107b of one type have their circumferences arcuately cut away to provide a land which fits the bore of the cup-shaped member and said cut-away portion with the interior of the cup-shaped member and the adjacent disks provides an arcuate passage. The disks 107c of the other type interfit the interior of the cup-shaped member and are provided on their circumferences with slots forming connecting passageways between the arcuate passageways surrounding the disks 107b. It will be observed that the slots in the circumferences of the disks 107c are alternately arranged on opposite sides of the lands of the disks 107b. Consequently when the alternate disks 107b and 107c are assembled in the member 107, as shown in Fig. 6, a continuous tortuous passageway is provided through the member, it being noted that the slot in the disk 107c adjacent to the opening or port 109 is provided with a groove 107d extending from the circumferential slot to said opening. The time required for the pressure fluid to flow through the member 107 may be varied by increasing or decreasing the number of disks.

When the control lever 74 is moved into "brake" position as shown in Fig. 4 to cause pressure fluid at full line pressure to flow into the brake cylinder to apply the brake with maximum pressure and into the chamber 105 of the brake valve, it will be seen that said pressure fluid after a suitable time delay will flow through the port 109 and act on the left hand side (as viewed in the drawing) of the valve plunger in the chamber 102 and move said plunger toward the right until the wide land 103 of the plunger passes to the right of the exit of the passage 101 into the chamber 102. At this time the further right hand movement of the valve plunger is positively arrested and the pressure fluid in the passage 101 may now flow through the chamber between the lands 103 and 104 and into a passage 110 in the valve housing. A spring pressed plunger 111 is slidably mounted in the passage 110 and normally closes a port 112 which is connected to a line 113 that extends to the reservoir or sump. However, when pressure fluid is flowing into the passage 110 and the pressure of said fluid exceeds a predetermined amount, said plunger will be moved against the action of the spring until the port 112 is uncovered and the pressure fluid flows with reduced pressure through line 99, passage 101, valve chamber 102, passage 110, port 112 and passage 113 back to the reservoir or sump, whereupon the pressure in the brake cylinder 94 is reduced to a predetermined relative low pressure and the brake is held lightly applied as long as the control lever 74 is in the "brake" position, thus permitting the spindle 17 to be turned by hand for loading purposes.

It will be understood that by this means the brake is held applied with maximum pressure for a predetermined period due to the action of the time delay device in the brake valve 100 and then is held applied with a relative low predetermind pressure until the lever 74 is moved from "brake" position. Thus the spindle rotation is quickly stopped and the spindle is held in its stopped position, although it may be turned manually for loading or unloading purposes. The right hand end of the brake valve 100, as viewed in the drawing, is connected by a line 114 to a port 115 located midway of the ends of the housing of a shuttle valve 116. The shuttle valve 116 is provided in its valve chamber with a slidable plunger 117 which when in its most right hand position, as viewed in Fig. 4, closes a port 118 in the end of the shuttle valve and which port is connected with the line 82 that extends to the forward clutch 20. At this time the port 119 in the opposite end of the shuttle valve is open and said port is connected by a line 120 with the line 91 that extends to the reverse clutch 21.

In Fig. 3 the position of the plunger 117 of the shuttle valve is at the opposite end of the valve housing from that shown in Fig. 4 and at such time the port 119 is closed by the plunger and the port 118 is open and therefore is in communication with the line 114. Hence it will be seen that after the brake has been applied and the plunger of the brake valve 100 moved to its most right hand position, as indicated in Fig. 4, it will be restored automatically to its original and left hand position as indicated in Fig. 3 as soon as the operator moves the control lever 74 to either the "forward" or the "reverse" position to cause pressure fluid to flow in the line 82 or 91 to engage the forward clutch 20 or the reverse clutch 21 to effect forward or reverse drive of the spindle. Therefore the brake mechanism is reset automatically for its operative cycle each time the brake has been applied as soon as a working drive is imparted to the spindle.

It will be understood that since the plunger of the brake valve 100 moves toward the left to be restored to its original position if any pressure is built up between the left hand end of the plunger and the cup 107 sufficient to overcome the action of the spring 108 and move said cup toward the left, then this pressure will bleed by means of the port 121 into the passage 101. It will be noted also that any fluid which is at the right of the plunger as viewed in Fig. 3, can drain through the shuttle valve and through the selector valve to the sump when the plunger moves toward the right during the application of the brake.

The manual operation of the control lever for effecting the engagement and disengagement of the forward clutch 20 and the reverse clutch 21 to effect forward or reverse rotation of the spindle and the application of the brake having been described the arrangement whereby said control lever 74 is utilized to initiate the automatic cycle of the speed changing operation will now be described.

Assuming that the machine is functioning in the first operative step of the work cycle wherein the work spindle 17 is rotating in the forward direction at a certain speed and at this time the spools 53 and 54 are in their separated or indexing position as shown in Fig. 3, it will be noted that the spring pressed interlock rod 122 is in its spring retracted position as indicated in Fig. 3 and therefore is out of engagement with any of the recesses or openings 58 in the interlock drum 57 fixed to the shaft 55. Consequently the operator can now index the spools 53 and 54 by rotating the hand wheel 56 to preselect the spindle speed desired for the next or second operative step of the cycle. Assuming that the spindle is to continue to rotate in the forward direction in the next or second operative step but at a different speed than during the first step, the operator as soon as the first operative step is completed moves the control lever 74 from "forward" position to "neutral" position and then rocks said lever inwardly toward the headstock as indicated in dot and dash lines in Fig. 2. When the control lever 74 is in "neutral" position it overlies the outer end 123 of the shift valve plunger 68 and hence the inward rocking of the control lever 74 pushes said plunger 68 inwardly of the housing of the shift valve 66 from the position of Fig. 3 to the position of Fig. 4.

The control lever 74 is only momentarily pushed inwardly and then allowed to return to its outer position, but this is sufficient to move the plunger 68 as just described. During the inward movement of the plunger 68 the interlock rod 122 is pushed toward the interlock drum 57 by the cam portion 124 on the plunger 68 until the outer end of the rod 122 engages in the opening 58 of the drum that is aligned with the rod to lock the drum and the shaft 55 against indexing rotation by the operator during the gear shifting operation. At this time the opposite end of the rod 122 is in the cam groove 125 on the plunger 68 and the spring on said rod 122 is compressed. Therefore the rod 122 not only holds the interlock drum 57 against rotation but also at this time holds the plunger 68 against outward shifting movement due to vibration or jarring.

When the plunger 68 moves from the position shown in Fig. 3 into the position shown in Fig. 4 the line 71 leading to the selector valve 72 is disconnected from the incoming pressure fluid line 65 since the land 70 on the plunger 68 has moved intermediate the ports in the shift valve housing with which the lines 65 and 71 are connected when the plunger is in the position of Fig. 3. At this time the line 71 is connected with the reservoir through line 71a. After the plunger 68 has moved to the position shown in Fig. 4 the line 65 is in communication with the line 126, since the ports in the shift valve housing to which the lines 65 and 126 are connected both now lie intermediate the lands 69 and 70 of the plunger 68. At this time the land 184 on the left hand end of the plunger 68 is engaging the left hand end of the housing of the shift valve 66 and is covering a port 127 in said end of the housing. Any pressure fluid to the left of the land 184 is free to return to the reservoir or sump through line 183, ports 166 and 165 of the spool shifting unit, later to be described, and line 186 which leads to the sump. The line 126 extends to and is connected with a port 128 formed in the housing of an interrupter valve 129 which is now in the position shown in Fig. 3. The shifting of the plunger 68 into the position shown in Fig. 4 does not immediately cause the plunger 130 of the interrupter valve 129 to move out of the position in which it is shown in Fig. 3 and consequently at this time the port 128 and the line 126 are in communication with the port 131 of the interrupter valve and the line 132 connected to said port and leading to the reset valve later to be described, it being noted that the ports 128 and 131 are located intermediate the lands 133 and 134 of the plunger 130. Therefore pressure fluid now flows through the lines 65 and 126, the interrupter valve 129, the line 132 and into the end of the reset valve 135 to move the plunger of said reset valve against the action of the valve spring from the position shown in Fig. 3 into the position shown in Fig. 4. At such latter time the line 64 from the relief valve 63 and connected to a port in the housing of the reset valve 135 is in communication with the line 136 also connected to a port in the housing of the reset valve 135 and leading to a crawl speed valve later to be described, it being noted that said ports at this time lie intermediate the lands 137 and 138 of the valve plunger. Therefore pressure fluid from the line 64 flows through the reset valve 135 and through the line 136 to the crawl speed valve 139.

The crawl speed valve 139 is provided with two chambers separated by an internal flange 140. A time delay device, indicated generally at 141 and similar to the time delay device of the brake valve 100, is mounted in one of said chambers and said line 136 communicates directly with this latter chamber. It will be noted that said latter chamber is also in communication with a passage 142 formed in the housing of the crawl speed valve 139 and communicating at one of its ends with the outer chamber of said valve and at its opposite end with line 143 leading to the cylinder 49 of the crawl speed clutch. Therefore since pressure fluid is in the line 136 it flows through the first mentioned chamber of the crawl speed valve 139 and into the passage 142 and into the line 143 and causes the piston 144 of the crawl speed clutch and which is splined on the shaft 25 to shift in the clutch cylinder to bring the friction plate carried by the piston into engagement with a friction plate carried by the hub of the worm wheel 145 which meshes with the worm 48 previously referred to. Consequently the shaft 25 now will be driven from the shaft 19 through the shaft 47 at a slow non-working or crawl speed to facilitate the shifting of the gearing.

The crawl speed valve 139 has slidably mounted in the other of its chambers a plunger formed with a wide land 146 and a narrow land 147 and prior to pressure fluid entering the line 136 said wide land 146 closes the end of the passage 142 opposite to the end to which the line 143 is connected (see Fig. 3). However, when pressure fluid enters the crawl speed valve 139 from the line 136 it will, after a predetermined delay, pass through the time delay device 141 and into the chamber containing said plunger and will act to move said plunger from the position shown in Fig. 3 into the position shown in Fig. 4, it being understood that the crawl speed clutch 49 remains engaged during this time period. As soon as the plunger of the crawl speed valve 139 is in the position shown in Fig. 4 the passage 142 in said valve is in communication between the lands 146 and 147 of the plunger with a passage 148, wherefore pressure fluid in addition to flowing from the line 136 through the valve 139 and into the line 143 also now flows through the passages 142 and 148 and into line 149 which is connected to the end of the interrupter valve 129. The line 149 is interconnected by a line 150 to a passage 151 formed in the housing of the spool shifting unit 152.

The pressure fluid flowing from line 149 into the interrupter valve 129 must first pass through a time delay device 153 similar to the time delay devices 107 and 141 and is in the position shown in Fig. 3 for a purpose later to be explained. The pressure fluid in line 150 connected to the spool shifting unit and in the passage 151 acts on a large piston 154 and on a valve plunger 155 to shift said piston and plunger from the position shown in Fig. 3 into the full line position of Fig. 4, assuming that the shifted gears properly intermesh.

Figure 5:
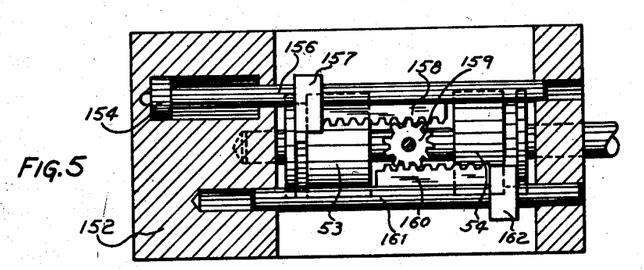
Fig. 5 is a sectional view taken along line 5—5 of Fig. 3.

The piston 154 is connected to a piston rod 156 that is slidable in suitable bearing openings formed in the housing of the spool shifter unit 152 (see Figs. 3 and 4). The piston rod 156 has fixed thereto a yoke 157, the fork of which straddles and engages in an annular groove in the spool 53 (see Figs. 3 and 5). The rod 156 also has fixed to it a rack 158, and said rack meshes with a pinion 159 which in turn meshes with a rack 160 carried by a rod 161 slidably mounted in the housing of the spool shifter unit to move parallel to the rod 156 but in the opposite direction. The rod 161 has fixed thereto a yoke 162, the fork of which straddles and engages in an annular groove formed in the spool 54. Consequently when the piston 154 is moved from the position shown in Fig. 3 into the full line position of Fig. 4 the spools 53 and 54 are moved from their separated indexing position toward each other with an equalized movement to cause the projections on the adjacent faces of the spools to act on the gear forks 50, 51 and 52 to move the same in a predetermined manner to shift the gear cones to obtain the spindle speed selected or preselected by the indexing of the spools previously referred to. In those instances wherein the gears immediately intermesh properly and the piston 154 moves to its full right hand position on the first stroke, the interrupter valve 129 remains in the position shown in Fig. 3, since the time delay to the passage of pressure fluid through the device 153 is greater than the period required for the full stroke of the piston 154.

Assuming that the gears which are to be intermeshed by the shifting have a relationship such that the gear teeth cannot mesh, then the movement of the piston 154 toward the right may be arrested before it reaches its full line position of Fig. 4 and in the intermediate position indicated by dotted lines therein. However, the valve plunger 155 in the spool shifting unit has moved completely to its full right hand position, as indicated in Fig. 4, and wherein the plunger land covers the port 163 while the ports 164 and 165 are placed in communication with each other as are the ports 166 and 167. Any pressure fluid compressed in line 185 by the movement toward the right of the plunger of the crawl speed valve 139 returns now to the reservoir through ports 164 and 165 and line 186.

The stopping of the movement of the piston 154 before it reaches its full right hand position causes the pressure of the fluid in lines 150 and 149 to build up and to shift the time delay device 153 of the interrupter valve 129 against the action of its spring from the position shown in Fig. 3 into the position shown in Fig. 4. The build-up of pressure in line 149 as just referred to is insufficient to overcome the spring which maintains the ball valve 168 seated in the housing of the crawl speed valve 139. As soon as the time delay device 153 has been shifted into the position shown in Fig. 4 the pressure fluid in line 149 is free to by-pass the time delay device and flow through passage 169 in the housing of the interrupter valve 129 and into the valve chamber to act immediately on the land 170 of the plunger 130 to shift said plunger from the position shown in Fig. 3 into the position shown in Fig. 4. At this time the pressure fluid flowing from the shift valve and line 126 through port 128 into the interrupter valve is trapped between the lands 133 and 134. Also at this time the pressure fluid in line 132 which connects the port 131 with the upper end of the reset valve 135 is free to return to the sump through port 173 and line 174 and therefore pressure against the end of the reset valve plunger is relieved and said valve plunger is moved by its spring from the position shown in Fig. 4 back to the position shown in Fig. 3. At this time the pressure fluid in line 136 from the reset valve and in the crawl speed valve 139 returns from said line to the reservoir through the port 175 and line 176 and thus the crawl speed clutch is disengaged and the pressure against piston 154 is relieved. Also at this time the pressure fluid in line 64 from the relief valve can flow through the reset valve 135 (now in the position of Fig. 3) through ports 177 and 178 now located between the lands 137 and 138 of the reset valve plunger and into line 179 which is connected with a passage 180 in the housing of the spool or gear shifter unit 152. Said passage 180 communicates with the right hand ends of the chambers in which the piston 154 and valve plunger 155 are located. Consequently pressure fluid now acts on said piston and plunger to move the same toward the left into the position of Fig. 3, thus separating the spools 53 and 54 and relieving the force tending to shift the gears that do not intermesh.

The movement of the piston 154 and the plunger 155 into the position of Fig. 3 causes the pressure fluid from line 179 to flow through ports 163 and 164 of the gear shifting unit into line 185 leading to the right hand end of the crawl speed valve 139, with the result that the plunger of said crawl speed valve is shifted from the position shown in Fig. 4 into the position shown in Fig. 3 with the wide land 146 interrupting communication between the passages 148 and 142 of said crawl speed valve and thus relieving pressure in line 149 leading to the lower end of the interrupter valve which is still in the position shown in Fig. 4. As soon as this occurs the spring of the time delay device 153 moves the cup-shaped member of said device into the position of Fig. 3, thus closing communication between the line 149 and the by-pass passage 169 of the interrupter valve. The spring of the interrupter valve acts on the plunger 130 to move the same from the position shown in Fig. 4 into the position shown in Fig. 3, it being noted that any fluid trapped between the land 170 of said plunger and the time delay device 153 can escape through said device through line 149, passage 148 of the crawl speed valve, the ball valve 168 and into passage 136 and back to the sump through the reset valve and passage 176, it being understood that the strength of the spring in the interrupter valve is sufficient to overcome the spring acting on the ball valve 168. At this time pressure fluid immediately flows through line 65, shift valve 66, line 126, ports 128 and 131 of interrupter valve 129 into line 132, whereupon the plunger of the reset valve 135 is moved from the position shown in Fig. 3 against its spring into the position shown in Fig. 4, and line 64 from the relief valve is again connected through the reset valve with line 136 and pressure fluid is flowing through the crawl speed valve 139 to the crawl speed clutch 49 to engage said clutch and cause a slow non-working rotation to be imparted again to the gearing. Also at this time line 179 from the spool shifting unit is connected to the reservoir through the reset valve 135, port 181 and line 182 so that now there is no pressure fluid acting on the piston 154 to move the same toward the left. The instant that the pressure fluid again flows through crawl speed valve 139 pressure fluid also again flows into the passage 151 to act on the piston 154 and plunger 155 to move the same toward the right and to cause the spools to move toward each other and complete the shifting of the gears.

From the foregoing it will be seen that in the operation of the automatic gear shifting cycle if the gears do not intermesh the pressure builds up to cause the shifting movement thereof to cease; the gears are given a further slow rotation, and then the shifting movement is repeated to bring the gears into full intermesh relationship. The operation whereby the shifting of the gears is momentarily stopped and then resumed to prevent gear clashing or injury will be repeated automatically if necessary until the gears can be intermeshed quietly and easily.

Assuming that the gear shift has been completed and the gears intermeshed, the piston 154 will have completed its stroke toward the right to the full line position of Fig. 4, it being recalled that plunger 155 is also in its most right hand position as indicated in Fig. 4. As soon as the piston 154 has reached its most right hand position pressure fluid flows from the cylinder in which the piston operates, through the port 167, through the cylinder in which the plunger 155 operates, through port 166 and into line 183 and acts on piston head 184 on the left hand end of the plunger 68 of shift valve 66 to move said plunger from the position shown in Fig. 4 into the position shown in Fig. 3. Therefore the shift valve 66 is restored to its initial position and the restoration of said valve causes the rod 122 to first ride out of the groove 125 and over the cam 124 from the position shown in Fig. 4 to the position shown in Fig. 3 with the spring on said rod acting to retract the outer end of the rod from the opening 58 of the interlock drum 57 in which it had been positioned during the gear shifting operation.

As soon as the shifter valve is restored to its original position of Fig. 3 communication between line 65 from the relief valve and line 126 to the interrupter valve is interrupted, but line 65 is placed in communication with line 71 leading to the selector valve 72 and since the control lever 74 has already been moved to the forward position, pressure fluid flows from line 71 through passages 75 and 76 of the valve plug 73 and into lines 78, 80 and 82 to the forward clutch 20 to engage said clutch and drive the transmission at the newly attained speed.

Inasmuch as line 126 from the shift valve to the interrupter valve is now disconnected from line 65 and is connected by line 187 to the sump, pressure in said line 126 and in line 132 leading to the reset valve immediately falls and the plunger of reset valve 135 returns under the action of its spring from the position of Fig. 4 into the position of Fig. 3. The instant that the plunger of reset valve 135 returns to the position shown in Fig. 3, line 136 leading from the reset valve to the crawl speed valve is connected to the reservoir through line 176 and hence pressure fluid is not flowing through the crawl speed valve 139 into line 143 and the crawl speed clutch 49 is immediately disengaged. This return movement of the plunger of reset valve 135 occurs immediately upon the plunger 68 of the shift valve 66 being moved to its initial position and prior to the engagement of the forward clutch 20 and results in the crawl speed clutch 49 being disengaged before the engagement of the forward clutch. Since pressure fluid can flow from line 64 from the relief valve through ports 177 and 178 of the reset valve 135 into line 179 leading to the spool shifting unit and through passage 180 to move piston 154 and plunger 155 from their most right hand positions as shown in Fig. 4 to their most left hand positions as shown in Fig. 3, the pressure fluid from passage 180 can now flow through port 163, port 164 and line 185 into the crawl speed valve 139 to move the valve plunger from the position shown in Fig. 4 to reset the same in the position shown in Fig. 3, at which time the wide land 146 interrupts the communication between passages 142 and 148 of the crawl speed valve.

The movement of the piston 154 from the position of Fig. 4 to the position of Fig. 3 effects equalized separating movement of the spools 53 and 54 to move the same to indexing position, it being recalled that said spools can now be indexed since the rod 122 is not holding the interlock drum 57 against rotative movement. As long as the shift valve plunger and the reset valve are in the position of Fig. 3, the piston 154 and plunger 155 are held in their left hand position and the spools are maintained in separated indexing position. Any pressure generated in the passage 151 by the leftward movements of the piston 154 and plunger 155 is transmitted by line 150, line 149 to passage 148 of the crawl speed valve 139 and such pressure may act to unseat the ball valve 168 and the pressure fluid can return by way of the line 136 through the reset valve and line 176 to the reservoir.

From the foregoing description it will be seen that the cycle of the gear shifting operation is carried out automatically and is initiated manually by the momentary inward movement of the control lever when in neutral position to move the plunger 68 of the shift valve 66 from the position of Fig. 3 to the position of Fig. 4. It will have been noted that said plunger 68 upon the completion of the gear shifting operation is restored automatically to its original position of Fig. 3. It will also have been observed that the inward movement of the plunger 68 to initiate the gear shifting operation acts to position the interlock rod 122 to prevent turning of the interlock drum 57 and the shaft 55 during the gear shifting operation and hence the operator cannot inadvertently index the spools 53 and 54 when the gears are being shifted.

It will also be noted that the restoration of the plunger 68 of the shift valve 66 to its initial position automatically acts to effect the disengagement of the interlock rod 122 from the openings in the interlock drum and thus as soon as the shift valve plunger 68 is in its initial position the spools 53 and 54 which have been separated automatically at the conclusion of the gear shifting operation can be indexed to preselect a different spindle speed.

Assuming that the third operative step of the work cycle calls for a different speed of the spindle than the second step and that the spindle is to rotate in the reverse direction during the third step the following occurs: During the second operative step of the cycle the operator turns the hand wheel 56 to the desired position to index the spools 53 and 54 to preselect the spindle speed for the third operative step. Upon the completion of the second operative step the operator moves the control lever 74 from forward position into neutral position to disengage the forward clutch 20 and he momentarily pushes said control lever while in the neutral position inwardly to move the shift valve plunger 68 from the position shown in Fig. 3 to the position shown in Fig. 4 and initiate the automatic gear shifting cycle and then he swings the control lever 74 from neutral position into reverse position. The gear shifting operation is effected automatically in the manner previously described and as soon as the shift valve plunger 68 has been returned from the position of Fig. 4 into the position of Fig. 3 at the conclusion of the gear shifting operation the pressure fluid from line 71 from the shift valve flows through passages 75 and 76 in the selector valve plug 73 and into port 90 of the selector valve and through line 91 to the reverse clutch 21 and causes the engagement of said clutch, whereupon the spindle will be rotating at the preselected speed for the third operative step and in the reverse direction. In this way the spindle speeds and direction of rotation can be obtained for each operative step of the work cycle and at the end of the last operative step the operator can move the control lever 74 into neutral position to disengage both the forward and reverse clutches and if desired he can move said control lever into brake position to apply the brake in the manner previously described.

The detailed description herein set forth clearly points out that the construction embodying the present invention accomplishes the objects enumerated at the start of this specification and reference to said objects is in order.

Although a preferred embodiment of the invention has been illustrated and described herein it will be understood that the invention is susceptible of various modifications and adaptations within the scope of the appended claims.

Having thus described my invention, I claim:

1. In a machine tool having a movable part, a transmission for imparting working speeds to said part and including shiftable gears, shifting means connected with said gears and movable from a speed selecting indexing position to a gear shifting position, mechanism for moving said shifting means to and from said positions and including a pressure fluid motor, means for imparting a crawl speed to said transmission to facilitate the shifting of said gears and including a clutch and a pressure fluid motor for engaging said clutch, a pressure fluid supply source, control means for causing sequential operation of said motors and including pressure fluid lines interconnecting said motors and said source, a reset valve in said lines and normally causing said first motor to move said shifting means to indexing position and normally interrupting communication between said second motor and said source to maintain said clutch disengaged, a shift valve in said lines and manually movable from a normal position to an active position to initiate a complete automatic gear shifting cycle and to cause movement of said reset valve from its normal position to a position wherein said second motor is placed in communication with said source to effect engagement of said crawl speed clutch while said first motor is momentarily disconnected from said source, a time delay device interposed in the line between said second motor and said reset valve and connected to said first motor and including a control valve movable automatically from a normal position after a predetermined time delay to a position to connect said first motor through said device with said source to cause gear shifting operation thereof, and a valve operatively associated with said first motor and automatically movable from a normal position when said motor is thus operated to cause automatic restoration of said shift valve, said reset valve and said control valve to their normal positions with a consequent operation of said first motor to restore said gear shifting means to indexing position and said last valve to its normal position and to cause interruption of the communication between said second motor and said source to disengage said clutch.

2. In a machine tool having a movable part, a transmission for imparting working speeds to said part and including shiftable gears, shifting means connected with said gears and movable from a speed selecting indexing position to a gear shifting position, an indexible member operatively associated with said shifting means for indexing the latter, mechanism for moving said shifting means to and from said positions and including a pressure fluid motor, means for imparting a crawl speed to said transmission to facilitate the shifting of said gears and including a clutch and a pressure fluid motor for engaging said clutch, a pressure fluid supply source, control means for causing sequential operation of said motors and including pressure fluid lines interconnecting said motors and said source, a reset valve in said lines and normally causing said first motor to move said shifting means to indexing position and normally interrupting communication between said second motor and said source to maintain said clutch disengaged, a shift valve in said lines and manually movable from a normal position to an active position to initiate a complete automatic gear shifting cycle and to cause movement of said reset valve from its normal position to a position wherein said second motor is placed in communication with said source to effect engagement of said crawl speed clutch while said first motor is momentarily disconnected from said source, an interlock element actuated by said shift valve during its said manual movement to lock said indexible member against indexing movement, a time delay device interposed in the line between said second motor and said reset valve and connected to said first motor and including a control valve movable automatically from a normal position after a predetermined time delay to a position to connect said first motor through said device with said source to cause gear shifting operation thereof, and a valve operatively associated with said first motor and automatically movable from a normal position when said motor is thus operated to cause automatic restoration of said shift valve, said reset valve, said control valve and said interlocking element to their normal positions with a consequent operation of said first motor to restore said gear shifting means to indexing position and said last named valve to its normal position and to cause interruption of the communication between said second motor and said source to disengage said clutch.

3. In a machine tool as defined in claim 1 and wherein an interrupter valve is located in said pressure fluid lines and is connected to said reset valve, said shift valve, said time delay device and said first motor and includes a valve plunger movable from a normal position automatically under the built-up pressure in the line between said interrupter valve and said first motor when said first motor is unable to complete the shifting of the gears to cause a restoration of the reset valve to normal position to effect reverse operation of said first motor and a disengagement of the crawl speed clutch and then said plunger is automatically movable back to normal position upon the diminution of the built-up pressure to cause movement of said reset valve from normal position to a position wherein said second motor is actuated to engage said crawl speed clutch and said first motor is actuated in a gear shifting direction.

4. In a machine tool as defined in claim 1, a power source, a second clutch for connecting the transmission to said power source for operation at different working speeds, pressure fluid operated means for actuating said second clutch, a selector valve connected to said pressure fluid operated means and to said source of pressure fluid supply through said shift valve when the latter is in normal position, said selector valve being movable to selectively cause engagement or disengagement of said second clutch, said selector valve being disconnected from said source of pressure fluid supply when said shift valve is manually moved from said normal position to said active position to initiate the automatic gear shifting cycle.

5. In a machine tool as defined in claim 1, a power source, a second clutch for connecting said power source with said transmission for imparting working speeds to said part, pressure fluid operated means for actuating said second clutch, a selector valve for controlling said pressure fluid operated means and connected thereto and to said pressure fluid supply source through said shift valve when the latter is in its said normal position, and a manually operated control member operatively connected with said selector valve to effect engagement or disengagement of said second clutch and operatively associated with said shift valve to effect the movement thereof from its said normal position to its said active position to initiate the automatic gear shifting cycle.

6. In a machine tool as defined in claim 1, a power source, a second clutch for connecting said transmission to said power source for operation at working speeds, pressure fluid operated means for actuating said second clutch, a selector valve for controlling said pressure fluid operated means and connected thereto and to the pressure fluid supply source through said shift valve when the latter is in its normal position, and a control member operatively connected with said selector valve and movable in one plane to move the latter into positions to control the engagement or disengagement of said second clutch and movable in another plane to effect shifting of said shift valve from its said normal position to its said active position to initiate the automatic gear shifting cycle.

7. In a machine tool having a movable part, a brake mechanism operatively associated with said part for braking the movement thereof, pressure fluid operated means for actuating said brake mechanism, a pressure fluid supply source, means interconnecting said pressure fluid operated means with said source, a selector valve movable from a position wherein said interconnecting means is interrupted to a position wherein said pressure fluid operated means is subjected to full line pressure, a brake valve connected to said interconnecting means intermediate said pressure fluid operated means and said selector valve and including a time delay device, a valve plunger moved by the pressure fluid passing through said time delay device to cause the pressure fluid to partially by-pass said device and act on a spring controlled valve element to move the latter under predetermined pressure to reduce the pressure of the pressure fluid flowing to said pressure fluid operated means whereby said brake mechanism is first applied with full force and then after a predetermined time delay automatically is maintained applied with a predetermined reduced force.

8. In a machine tool as defined in claim 7, a power source, clutches for connecting said power source with said movable part to drive the latter in opposite directions, second pressure fluid operated means for actuating said clutches said selector valve being connected with said second pressure fluid operated means and movable to a position to control engagement and disengagement of said clutch, and a shuttle valve connected with said selector valve, said brake valve and said second pressure fluid operated means and functioning when either of said clutches is engaged to automatically restore the plunger of said brake valve to normal position.

9. A time delay device adapted to be used in a pressure fluid circuit and comprising a housing member having a longitudinally extending opening therein, means located in said housing and filling said opening, said means being provided with longitudinally spaced peripheral cutouts forming narrow land portions and with said housing peripheral passages embracing said means and extending from one side of said lands to the other side thereof, said means being provided intermediate said peripheral passages with slots interconnecting said peripheral passages, said slots being located alternately on opposite sides of said land portions, said peripheral passages and said slots together forming a tortuous passageway through said device.

10. A time delay device adapted to be used in a pressure fluid circuit and comprising a housing having a longitudinally extending opening therein, a plurality of disks located within said opening and of a size to interfit the same, said disks being arranged in two series with the disks of one series alternating with the disks of the other series, the disks of one series each being cut away on its periphery to provide a relatively narrow land portion and a peripherally extending cutout forming with said housing and the adjacent disks an extended passageway from one side of said land portion to the other side thereof, the disks of the other series each being provided with a slot interconnecting the adjacent peripheral passageways, the disks of said other series being so located with respect to the disks of said one series that said slots alternately are on opposite sides of the land portions of the disks of said one series whereby a tortuous passageway is formed through the device which extends around the disks of the one series and through the slots of the disks of the other series.

11. In combination, a cylinder, a plunger movable therein, a pressure fluid supply source, means for connecting said cylinder and said source, and a time delay device interposed between said plunger and said source and including a housing member having a longitudinally extending opening therethrough, longitudinally extending means located in said opening, said means being provided on its periphery and at longitudinally spaced points with cutouts forming narrow land portions and with said housing peripheral passageways from one side of said land portions to the other side thereof, said means also being provided intermediate said cutouts with slots interconnecting said peripheral passageways and located alternately on opposite sides of and close to said land portions to form a tortuous passageway through said member whereby a predetermined time delay occurs in building up pressure in said cylinder to move said plunger.

12. In a hydraulic control for a machine tool having a movable part as defined in claim 1 and wherein there is a power source for actuating said transmission, a brake mechanism operatively associated with said movable part for braking the movement thereof, pressure fluid operated means for actuating said brake and mechanism, means interconnecting said pressure fluid operated means with said pressure fluid supply source, a selector valve movable from a position wherein said interconnecting means is interrupted to a position wherein said pressure fluid operated means is subjected to full line pressure, a brake valve connected to said interconnecting means intermediate said pressure fluid operated means and said selector valve and including a time delay device, a valve plunger moved by the pressure fluid passing through said time delay device to cause the pressure fluid to partially by-pass said device and act on a spring controlled valve element to move the latter under predetermined pressure to reduce the pressure of the pressure fluid flowing to said pressure fluid operated means whereby said brake mechanism is first applied with full force and then after a predetermined time delay automatically is maintained applied with a predetermined force, clutches for connecting said power source with said transmission to drive the latter in opposite directions, a second pressure fluid operated means for actuating said clutches, said selector valve being connected with said second pressure fluid operated means and movable to a position to control engagement and disengagement of said clutches, and a shuttle valve connected with said selector valve, said brake valve and said second pressure fluid operated means and functioning when either of said clutches is engaged to automatically restore the plunger of said brake valve to normal position.

FAY M. TOMLINSON.

REFERENCES CITED

The following references are of record in the file of this patent:

UNITED STATES PATENTS

| Number | Name | Date |
| --- | --- | --- |
| 2,136,454 | Miller | Nov. 15, 1938 |
| 2,161,088 | Reilly et al. | June 6, 1939 |
| 2,189,679 | Sanford | Feb. 6, 1940 |
| 2,421,206 | Kylin et al. | May 27, 1947 |